(12) United States Patent
Harding et al.

(10) Patent No.: US 8,944,332 B2
(45) Date of Patent: Feb. 3, 2015

(54) TESTING AUTOMATIC DATA COLLECTION DEVICES, SUCH AS BARCODE, RFID AND/OR MAGNETIC STRIPE READERS

(75) Inventors: Andrew C. Harding, Kirkland, WA (US); Jeffrey K. Suhr, Mukilteo, WA (US); Nicholas P. Allen, Edmonds, WA (US)

(73) Assignee: Intermec IP Corp., Everett, WA (US)

( * ) Notice: Subject to any disclaimer, the term of this patent is extended or adjusted under 35 U.S.C. 154(b) by 1316 days.

(21) Appl. No.: 11/833,461

(22) Filed: Aug. 3, 2007

(65) Prior Publication Data

US 2008/0029597 A1 Feb. 7, 2008

Related U.S. Application Data

(60) Provisional application No. 60/821,551, filed on Aug. 4, 2006.

(51) Int. Cl.
| | |
|---|---|
| *G06K 13/00* | (2006.01) |
| *G06K 7/00* | (2006.01) |
| *G06K 7/10* | (2006.01) |
| *G06F 11/22* | (2006.01) |
| *G06F 11/07* | (2006.01) |

(52) U.S. Cl.
CPC ............ *G06K 7/0008* (2013.01); *G06K 7/0095* (2013.01); *G06F 11/2294* (2013.01); *G06F 11/0748* (2013.01); *G06F 11/0709* (2013.01); *G06K 7/10* (2013.01)
USPC ............ 235/483; 709/203; 709/223; 709/227

(58) Field of Classification Search
CPC ............ G06F 11/0709; G06F 11/0748; G06F 11/2294; G06K 7/0095
USPC .................. 235/375, 435, 437, 438, 439, 454, 235/462.01, 462.15; 704/4; 707/102, 706; 709/227
See application file for complete search history.

(56) References Cited

U.S. PATENT DOCUMENTS

| | | | | |
|---|---|---|---|---|
| 3,787,670 | A | 1/1974 | Nelson et al. | 235/153 |
| 4,527,237 | A | 7/1985 | Frieder et al. | 364/200 |
| 4,801,786 | A | 1/1989 | Stobbe | 235/377 |
| 4,825,058 | A | 4/1989 | Poland | 235/472 |

(Continued)

FOREIGN PATENT DOCUMENTS

| | | |
|---|---|---|
| EP | 0 809 176 A2 | 11/1997 |
| JP | P2002-103746 A | 4/2002 |
| WO | WO 97/26750 | 7/1997 |

OTHER PUBLICATIONS

"UNIX man pages: apropos ()", Wilford, et al., Jul. 3, 2005, retrieved on Dec. 13, 2010 from http://unixhelp.ed.ac.uk/CGI/man-cgi?apropos.*

(Continued)

*Primary Examiner* — Christopher Stanford
(74) *Attorney, Agent, or Firm* — Additon, Higgins & Pendleton, P.A.

(57) ABSTRACT

Automatic data collection devices such as barcode readers, RFID readers, magnetic stripe readers and the like may be tested using ADC device test executables, modules or processes stored at a variety of network locations. One or more sets of tests or work lists may be defined to facilitate testing. Tests may be identified by name and/or keyword. Keywords may be indicative one or more functionalities tested by the respective ADC device test module.

31 Claims, 12 Drawing Sheets

(56) References Cited

U.S. PATENT DOCUMENTS

| | | | |
|---|---|---|---|
| 5,034,598 A | 7/1991 | Poland | 235/435 |
| 5,036,479 A | 7/1991 | Prednis et al. | 364/580 |
| 5,052,020 A | 9/1991 | Koenck et al. | 375/62 |
| 5,070,536 A | 12/1991 | Mahany et al. | 455/67 |
| 5,121,342 A | 6/1992 | Szymborski et al. | 364/514 |
| 5,218,188 A | 6/1993 | Hanson | 235/375 |
| 5,261,079 A | 11/1993 | Celi, Jr. | 395/500 |
| 5,295,154 A | 3/1994 | Meier et al. | 375/1 |
| 5,309,351 A | 5/1994 | McCain et al. | 364/132 |
| 5,322,991 A | 6/1994 | Hanson | 235/472 |
| 5,349,678 A | 9/1994 | Morris et al. | 395/800 |
| 5,365,546 A | 11/1994 | Koenck et al. | 375/9 |
| 5,404,493 A | 4/1995 | Bolme et al. | 395/500 |
| 5,418,684 A | 5/1995 | Koenck et al. | 361/680 |
| 5,425,051 A | 6/1995 | Mahany | 375/202 |
| 5,440,564 A | 8/1995 | Ovadia et al. | 370/112 |
| 5,453,933 A | 9/1995 | Wright et al. | 364/474.23 |
| 5,471,596 A | 11/1995 | Brown, III | 395/375 |
| 5,490,252 A | 2/1996 | Macera et al. | 395/200.01 |
| 5,493,213 A | 2/1996 | Collins, Jr. et al. | 324/158.1 |
| 5,497,450 A | 3/1996 | Helmbold et al. | 395/114 |
| 5,572,512 A | 11/1996 | Cutler, Jr. et al. | 370/13 |
| 5,577,229 A | 11/1996 | Wakerly | 395/474 |
| 5,579,367 A | 11/1996 | Raymond et al. | 379/1 |
| 5,586,281 A | 12/1996 | Miyama et al. | 395/405 |
| 5,602,742 A | 2/1997 | Solondz et al. | 364/464.2 |
| 5,604,516 A | 2/1997 | Herrod et al. | 345/146 |
| 5,613,160 A | 3/1997 | Kraslavsky et al. | 395/836 |
| 5,623,603 A | 4/1997 | Jiang et al. | 395/200.04 |
| 5,623,604 A | 4/1997 | Russell et al. | 395/200.1 |
| 5,640,002 A | 6/1997 | Ruppert et al. | 235/472 |
| 5,650,940 A | 7/1997 | Tonozuka et al. | 364/514 |
| 5,673,385 A | 9/1997 | Mack et al. | 395/183.2 |
| 5,724,510 A | 3/1998 | Arndt et al. | 395/200.5 |
| 5,742,762 A | 4/1998 | Scholl et al. | 395/200.3 |
| 5,748,884 A | 5/1998 | Royce et al. | 395/185.1 |
| 5,761,428 A | 6/1998 | Sidey | 395/200.53 |
| 5,799,317 A | 8/1998 | He et al. | 707/104 |
| 5,857,190 A | 1/1999 | Brown | 707/10 |
| 5,860,068 A | 1/1999 | Cook | 705/26 |
| 5,893,083 A | 4/1999 | Eshghi et al. | 706/45 |
| 5,914,474 A * | 6/1999 | Spitz | 235/438 |
| 5,917,043 A | 6/1999 | Sisko | 544/332 |
| 5,919,248 A | 7/1999 | Kahkoska et al. | 709/224 |
| 5,943,503 A | 8/1999 | Kai | 395/839 |
| 5,961,594 A | 10/1999 | Bouvier et al. | 709/223 |
| 5,969,326 A | 10/1999 | Ogami | 235/462.27 |
| 5,974,237 A | 10/1999 | Shurmer et al. | 395/200.54 |
| 5,979,757 A | 11/1999 | Tracy et al. | 235/383 |
| 5,982,753 A | 11/1999 | Pendleton et al. | 370/252 |
| 5,991,806 A | 11/1999 | McHann, Jr. | 709/224 |
| 5,999,948 A | 12/1999 | Nelson et al. | 707/506 |
| 6,006,034 A | 12/1999 | Heath et al. | 395/712 |
| 6,009,538 A | 12/1999 | Goodwin, III et al. | 714/25 |
| 6,027,024 A | 2/2000 | Knowles | 235/472.01 |
| 6,028,605 A | 2/2000 | Conrad et al. | 345/354 |
| 6,041,041 A | 3/2000 | Ramanathan et al. | 370/241 |
| 6,073,169 A | 6/2000 | Shuey et al. | 709/217 |
| 6,094,679 A | 7/2000 | Teng et al. | 709/220 |
| 6,095,422 A | 8/2000 | Ogami | 235/462.27 |
| 6,102,295 A | 8/2000 | Ogami | 235/472.01 |
| 6,108,782 A | 8/2000 | Fletcher et al. | 713/153 |
| 6,119,941 A | 9/2000 | Katsandres et al. | 235/462.07 |
| 6,122,664 A | 9/2000 | Boukobza et al. | 709/224 |
| 6,151,643 A | 11/2000 | Cheng et al. | 710/36 |
| 6,154,378 A | 11/2000 | Peterson et al. | 363/37 |
| 6,154,465 A | 11/2000 | Pickett | 370/466 |
| 6,161,123 A | 12/2000 | Renouard et al. | 709/203 |
| 6,163,802 A | 12/2000 | Lin et al. | 709/217 |
| 6,167,567 A | 12/2000 | Chiles et al. | 717/11 |
| 6,170,015 B1 | 1/2001 | Lavian | 709/232 |
| 6,175,868 B1 | 1/2001 | Lavian et al. | 709/223 |
| 6,178,426 B1 | 1/2001 | Klein et al. | 707/102 |
| 6,195,171 B1 | 2/2001 | Ochiai | 358/1.15 |
| 6,199,753 B1 | 3/2001 | Tracy et al. | 235/375 |
| 6,226,675 B1 | 5/2001 | Meltzer et al. | 709/223 |
| 6,229,540 B1 | 5/2001 | Tonelli et al. | 345/356 |
| 6,240,082 B1 | 5/2001 | Kim et al. | 370/342 |
| 6,243,105 B1 | 6/2001 | Hoyer et al. | 345/440 |
| 6,263,387 B1 | 7/2001 | Chrabaszcz | 710/103 |
| 6,269,330 B1 | 7/2001 | Cidon et al. | 704/43 |
| 6,272,537 B1 | 8/2001 | Kekic et al. | 709/223 |
| 6,285,889 B1 | 9/2001 | Nykänen et al. | 455/557 |
| 6,289,501 B1 | 9/2001 | Mutschler, III | 717/1 |
| 6,305,605 B1 | 10/2001 | Goetz et al. | 235/385 |
| 6,308,205 B1 | 10/2001 | Carcerano et al. | 709/221 |
| 6,321,348 B1 | 11/2001 | Kobata | 714/37 |
| 6,321,991 B1 | 11/2001 | Knowles | 235/472.01 |
| 6,321,992 B1 | 11/2001 | Knowles et al. | 235/478.01 |
| 6,330,597 B2 | 12/2001 | Collin et al. | 709/220 |
| 6,335,795 B1 | 1/2002 | Neuhard et al. | 358/1.15 |
| 6,356,949 B1 | 3/2002 | Katsandres et al. | 709/238 |
| 6,360,255 B1 | 3/2002 | McCormack et al. | 709/221 |
| 6,360,268 B1 * | 3/2002 | Silva et al. | 709/227 |
| 6,378,069 B1 | 4/2002 | Sandler et al. | 713/153 |
| 6,389,464 B1 | 5/2002 | Krishnamurthy et al. | 709/220 |
| 6,397,378 B1 | 5/2002 | Grey et al. | 171/4 |
| 6,398,105 B2 | 6/2002 | Ramberg et al. | 235/375 |
| 6,409,661 B1 | 6/2002 | Murphy | 600/300 |
| 6,438,711 B2 | 8/2002 | Woodruff | 714/27 |
| 6,457,883 B1 | 10/2002 | Silverbrook et al. | 400/62 |
| 6,460,070 B1 | 10/2002 | Turek et al. | 709/202 |
| 6,473,788 B1 | 10/2002 | Kim et al. | 709/209 |
| 6,473,798 B1 | 10/2002 | Grosser, Jr. et al. | 709/224 |
| 6,487,495 B1 * | 11/2002 | Gale et al. | 701/209 |
| 6,487,566 B1 | 11/2002 | Sundaresan | 707/513 |
| 6,488,209 B1 | 12/2002 | Hunt et al. | 235/462.15 |
| 6,507,856 B1 | 1/2003 | Chen et al. | 707/513 |
| 6,539,422 B1 | 3/2003 | Hunt et al. | 709/217 |
| 6,540,142 B1 | 4/2003 | Alleshouse | 235/462.01 |
| 6,568,596 B1 | 5/2003 | Shaw | 235/462.01 |
| 6,587,684 B1 | 7/2003 | Hsu et al. | 455/419 |
| 6,597,465 B1 | 7/2003 | Jarchow et al. | 358/1.12 |
| 6,614,804 B1 | 9/2003 | McFadden et al. | 370/468 |
| 6,618,162 B1 | 9/2003 | Wiklof et al. | 358/1.15 |
| 6,619,549 B2 * | 9/2003 | Zhu et al. | 235/462.45 |
| 6,655,593 B2 | 12/2003 | Alleshouse | 235/462.01 |
| 6,658,423 B1 * | 12/2003 | Pugh et al. | 702/102 |
| 6,764,009 B2 | 7/2004 | Melick et al. | 235/462.01 |
| 6,785,845 B2 | 8/2004 | Venkataraman | 714/27 |
| 6,810,364 B2 * | 10/2004 | Conan et al. | 702/188 |
| 6,857,013 B2 * | 2/2005 | Ramberg et al. | 709/223 |
| 6,908,034 B2 | 6/2005 | Alleshouse | 235/432 |
| 6,976,062 B1 | 12/2005 | Denby et al. | 709/220 |
| 7,438,217 B2 * | 10/2008 | Bhella et al. | 235/375 |
| 2002/0032538 A1 * | 3/2002 | Lee | 702/119 |
| 2002/0133749 A1 | 9/2002 | Petersen et al. | 714/27 |
| 2003/0058469 A1 | 3/2003 | Buis et al. | 358/1.15 |
| 2004/0049405 A1 | 3/2004 | Buerger et al. | 705/1 |
| 2004/0073654 A1 | 4/2004 | Sarma | 709/224 |
| 2005/0034029 A1 | 2/2005 | Ramberg et al. | 714/43 |
| 2005/0257215 A1 | 11/2005 | Denby et al. | 717/172 |
| 2005/0274801 A1 | 12/2005 | Harding et al. | 235/438 |
| 2007/0263773 A1 * | 11/2007 | Malik et al. | 379/1.01 |

OTHER PUBLICATIONS

"An extended introduction to the UNIX operating system, Helpers, alias, and communication commands", Sibenaler, Sep. 1997, p. 9, retrieved on Dec. 13, 2010 from http:old.arch.ethz.ch/Patrick/LOVAL/teach/unix/index.html.*

Deri, L., "Surfin' Network Resources Across the Web," IEEE, pp. 158-167, Mar. 1996.

Dr. Watson, retrieved Dec. 6, 2002, from www.cavebear.com/dwtnda/spd.html.

Harding et al., "Method, Apparatus and Article for Validating ADC Devices, such as Barcode, RFID and Magnetic Stripe Readers," Office Action mailed Apr. 8, 2008, for U.S. Appl. No. 11/130,792, 9 pages.

Harding et al., "Method, Apparatus and Article for Validating ADC Devices, such as Barcode, RFID and Magnetic Stripe Readers," Amendment filed Jul. 2, 2008, for U.S. Appl. No. 11/130,792, 10 pages.

(56) References Cited

OTHER PUBLICATIONS

Harding et al., "Method, Apparatus and Article for Validating ADC Devices, such as Barcode, RFID and Magnetic Stripe Readers," Office Action mailed Oct. 29, 2008, for U.S. Appl. No. 11/130,792, 9 pages.

Harding et al., "Method, Apparatus and Article for Validating ADC Devices, such as Barcode, RFID and Magnetic Stripe Readers," Response filed Jan. 27, 2009, for U.S. Appl. No. 11/130,792, 17 pages.

IBM, "Disk Drive with Embedded Hyper-Text Markup Language Server," *IBM Technical Disclosure Bulletin* 38(12):479, Dec. 1995. Ifsm651; http://userpages.umbc.edu/~palmar/; 1997.

Jander, Welcome to the Revolution, Data Communications, 25(16):39-42, 44, 46, 48, 50, 52-53, Nov. 21, 1996.

Jones, G., "Managing the Message: Message Tracking," *IEEE*, pp. 743-747, Apr. 1998.

Palmer, Roger C., "Reading, Printing and Specification of Bar Code Symbols," *The Bar Code Book*, 2nd ed., Helmers Publishing, Inc., Peterborough, New Hampshire, 1991, p. 107.

Preston, Internet Protocols Migrate to Silicon for Networking Devices, Electronic Design, 45(8):87-90, 92-94, Apr. 14, 1997.

Ramberg et al., "Remote Anomaly Diagnosis and Reconfiguration of an Automatic Data Collection Device Platform Over a Telecommunications Network," Office Action mailed May 30, 2007, for U.S. Appl. No. 10/934,064, 21 pages.

Ramberg et al., "Remote Anomaly Diagnosis and Reconfiguration of an Automatic Data Collection Device Platform Over a Telecommunications Network," Amendment filed Oct. 1, 2007, for U.S. Appl. No. 10/934,064, 17 pages.

Ramberg et al., "Remote Anomaly Diagnosis and Reconfiguration of an Automatic Data Collection Device Platform Over a Telecommunications Network," Office Action mailed Nov. 15, 2007, for U.S. Appl. No. 10/934,064, 25 pages.

Ramberg et al., "Remote Anomaly Diagnosis and Reconfiguration of an Automatic Data Collection Device Platform Over a Telecommunications Network," Amendment filed Mar. 17, 2008, for U.S. Appl. No. 10/934,064, 22 pages.

Susilo et al., Infrastructure for Advanced Network Management Based on Mobile Code, IEEE Network Operations and Management Symposium, 2(Conf. 10):322-333, New Orleans, Louisiana, Feb. 15-20, 1998.

What's New?; http//:www2.staff.fh-vorarlberg.ac.at/~kw/javascript/INetSDK/Help/inet0001.htm; 2003.

Renouard et al., U.S. Appl. No. 08/852,002, filed May 6, 1997, 43 pages.

\* cited by examiner

```
                                                        ← 800

Code 39 UDSI Test (Individual Test) [Loop 4 times]
Code 39 (Keyword)
        Code 39 Enable/Disable Test
        Code 39 Start Stop Transmission and Char Test
        Code 39 UDSI Test
        Code 39 Append Test
        Code 39 Check Digit Test
        Code 39 Length Mode Test
UDSI (Keyword)
        Codabar UDSI Test
        Code 93 UDSI Test
        Code 39 UDSI Test
        Code 128 UDSI Test
        . . .
"Enable/Disable" and "1D Symbology"(Query)
        Codabar Enable/Disable
        Code 93 Enable/Disable
        Code 39 Enable/Disable
        Code 128 Enable/Disable
        . . .
Group1 [Loop 5 times]
        Code 93 Disable
        Code 39 Enable
        Code 39 UDSI [Loop 3 times]
        Code 128 Enable
        Code 39 UDSI [Loop 3 times]
        Code 128 Disable
        Code 39 UDSI [Loop 3 times]
```

*FIG. 19*

TESTING AUTOMATIC DATA COLLECTION DEVICES, SUCH AS BARCODE, RFID AND/OR MAGNETIC STRIPE READERS

CROSS-REFERENCE TO RELATED APPLICATION

This application claims benefit, under 35 U.S.C. §119(e), of U.S. Provisional Patent Application No. 60/821,551, filed Aug. 4, 2006, which is incorporated herein, by reference, in its entirety.

BACKGROUND

1. Field

The methods, apparatus and articles described herein generally relate to automatic data collection (ADC) devices, such as readers capable of reading optical machine-readable symbols (e.g., barcode symbols, stacked code symbols, and/or matrix or area code symbols), radio frequency identification (RFID) tags, and/or magnetic stripes, and more particularly relate to methods, apparatus and articles to facilitate the upgrading, validating and testing of such ADC devices.

2. Description of the Related Art

The ADC field is generally directed to the use of devices to automatically capture data encoded in a variety of data carriers. Data carriers may take the form of media bearing machine-readable symbols, such as barcode symbols, stacked code symbols, matrix or area code symbols. Data carriers may take the form of active or passive RFID circuits carried by tags or cases. Data carriers may also take the form of media bearing magnetic stripes.

A variety of ADC devices and ADC media are ubiquitous and well known.

For example, readers for optically reading machine-readable symbols are common in a large variety of retail, warehouse and shipping environments. Such readers are commonly referred to as "barcode" readers, and typically take the form of either optical scanners or optical imagers. Optical machine-readable symbol readers may be fixed, such as those typically found at many grocery or supermarket checkout stands where the item bearing the machine-readable symbol is passed over the optical reader. Handheld machine-readable symbol readers are also common, where the operator either moves the reader to scan the desired machine-readable symbol or generally aims the optical machine-readable symbol reader at the desired machine-readable symbol and optionally activates a trigger or other switch to cause the optical reader to scan or capture an image of the machine-readable symbol.

RFID readers are becoming increasingly more common in retail, warehouse, and shipping environments. RFID readers wirelessly read and/or write information to RFID circuits, commonly referred to as RFID tags. Such RFID readers may be either fixed or handheld. RFID readers may operate with active RFID tags which contain a discrete power source such as a battery or ultra-capacitor, or may operate with passive RFID tags which derive power from an RF interrogation signal transmitted by the RFID reader. RFID tags may, or may not, include encryption and other security measures for controlling access to the data stored in the RFID tag.

Magnetic stripe readers are commonly found in a large variety of environments, such as in point-of-sale (POS) terminals for reading magnetic stripes carried by various media, for example financial cards such as credit cards, debit cards, and/or gift cards. Magnetic stripe readers typically rely on movement of the media relative to a magnetic reader head to magnetically capture the information encoded in the polarizations of the magnetic stripe.

An ADC device platform typically includes one or more ADC devices. For example, a POS terminal may include a barcode reader and a magnetic stripe reader, in addition to a keyboard, display, processor and cash drawer most commonly associated with traditional cash registers. In turn, the ADC devices may employ components or subsystems, which may or may not be modularized for easy replacement or substitution. For example, an optical machine-readable symbol reader may include a scan engine, an illumination system, an image capture device, and/or a decode section. An RFID reader may include a separate transmitter and receiver, along with associated antennas.

One problem that has hindered the ability to add or upgrade ADC devices or components on an ADC device platform is the extensive testing of new or upgraded ADC devices, associated components and/or functionality that must be performed to ensure that the ADC devices, associated components and/or functionality will work with the large number of existing ADC device platforms with respect to hardware, firmware and/or software. ADC device suppliers and end users have a large number of combinations and permutations of ADC device structures and functions that require testing. A related problem is the large amount of technical support and analysis that the manufacturer or supplier must typically supply the consumer to ensure that the ADC device and/or associated firmware or software is correctly installed, configured and/or operated. This problem is particularly exacerbated where initial testing of the "build" has not been adequately validated and tested, for example using regression techniques, before release of the new or upgraded ADC device, associated component and/or functionality.

Enhancing the ability to test ADC devices and/or ADC device platforms would be highly desirable to both the consumer and the manufacturers or suppliers of ADC platforms and devices. Such may, for example, facilitate the upgrade of ADC devices or components on an ADC platform.

BRIEF SUMMARY

In one embodiment, a method of testing automatic data collection devices includes automatically determining a set of functionalities of a target automatic data collection device to be tested; based on the determined set of functionalities of the target automatic data collection device, automatically identifying a number of automatic data collection tests to be run against the target automatic data collection device; executing at least one of the identified automatic data collection tests against the target automatic data collection device; and at least temporarily storing a set of results from the execution of the identified automatic data collection tests against the target automatic data collection device.

In another embodiment, a computer-readable medium stores instructions that cause a computer to test automatic data collection devices, by automatically determining a set of functionalities of a target automatic data collection device to be tested; based on the determined set of functionalities of the target automatic data collection device, automatically identifying a number of automatic data collection tests to be run against the target automatic data collection device; executing at least one of the identified automatic data collection tests against the target automatic data collection device; and at least temporarily storing a set of results from the execution of the identified automatic data collection tests against the target automatic data collection device.

In another embodiment, a method of facilitating testing automatic data collection devices includes receiving at least one keyword that is indicative of at least one functionality provided by some automatic data collection devices; and based on the received at least one keyword, searching at least a portion of a network for a number of automatic data collection tests that may be run against the automatic data collection devices which provide the at least one functionality indicated by the keyword.

In another embodiment, a system to facilitate testing automatic data collection devices includes a network connection; a processor; and a memory that stores processor executable instructions that cause the processor to receive at least one keyword that is indicative of at least one functionality provided by some automatic data collection devices, and based on the received at least one keyword, search at least a portion of a network for a number of automatic data collection tests that may be run against the automatic data collection devices which provide the at least one functionality indicated by the keyword.

In another embodiment, a method of automating the remote testing of automatic data collection devices includes locating a plurality of existing automatic data collection device tests on a network; automatically filtering the automatic data collection device tests by keywords to determine at set of relevant automatic data collection device tests; and running the automatic data collection device tests in the set of relevant automatic data collection device tests against at least one target automatic data collection device.

In another embodiment, a system to automate the remote testing of automatic data collection devices includes a network port to provide a connection to a network; and a processor configured to locate a plurality of existing automatic data collection device tests on the network, automatically filter the automatic data collection device tests by keywords to determine at set of relevant automatic data collection device tests; and run the automatic data collection device tests in the set of relevant automatic data collection device tests against at least one target automatic data collection device.

In another embodiment, a method of facilitating testing automatic data collection devices includes forming a first set of data that identifies a plurality of automatic data collection device tests, where an executable module for a respective one of each of the automatic data collection tests are stored at a number of different storage locations; and assigning at least a first identifier to the first set of data that identifies the number of automatic data collection device tests.

In another embodiment, a system for facilitating testing automatic data collection devices includes a network port to provide communications via a network; a processor coupled to the network port; and a processor-readable medium that stores instructions that cause the processor to facilitating testing by forming a first set of data that identifies a plurality of automatic data collection device tests, where an executable module for a respective one of each of the automatic data collection tests are stored at a number of different storage locations; and assigning at least a first identifier to the first set of data that identifies the number of automatic data collection device tests.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 19 is schematic illustration of a work list, according to one illustrated embodiment.

DETAILED DESCRIPTION OF THE INVENTION

Figure 1:
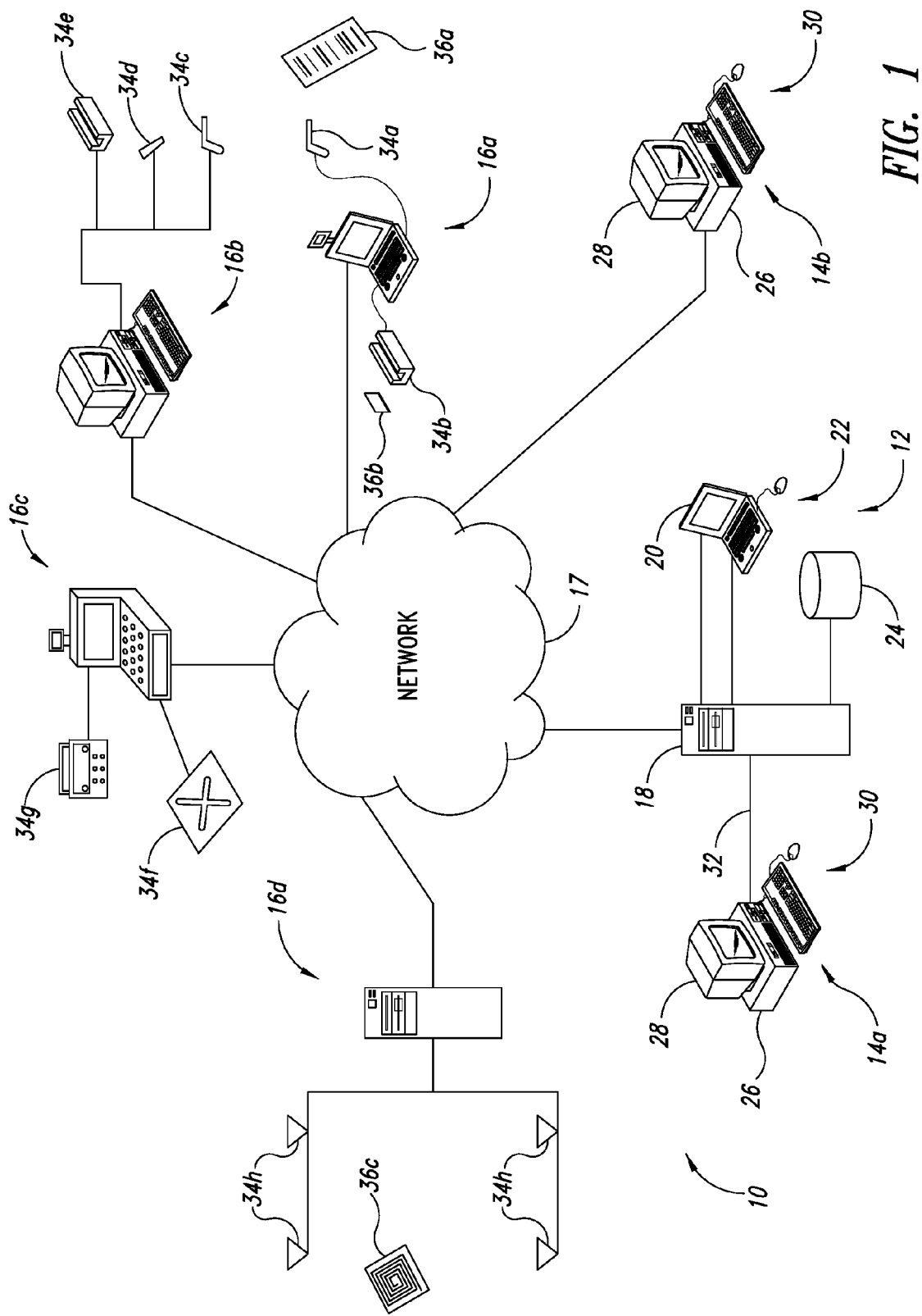
FIG. 1 is a schematic diagram of a networked environment in which at least one exemplary embodiment may operate.

In the following description, certain specific details are set forth in order to provide a thorough understanding of various embodiments of the invention. However, one skilled in the relevant art will recognize that the invention may be practiced without one or more of these specific details, or with other methods, components, materials, etc. In other instances, well known structures associated with ADC devices such as optical readers for reading machine-readable symbols, RFID readers for reading RFID tags, magnetic stripe readers for reading magnetic stripes, as well as computers, networks, and databases have not been shown or described in detail to avoid unnecessarily obscuring descriptions of the embodiments of the invention.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Further more, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings provided herein are for convenience only and do not interpret the scope or meaning of the claimed invention.

Disclosed are methods, apparatus and articles to provide a simple way of adding, locating, and running ADC device tests. The ADC device tests may be stored as executables, modules or processes at various network locations, including but not limited on a directory of a developer or tester's own computing system. The ADC device tests may contain a list of keywords that describe areas which the ADC device test is associated, for example functionalities and/or structure that are tested by the respective ADC device test. Keywords may be broad descriptions (e.g., "Data Collection" or "Network") or more specific (e.g., "Code 39", "DHCP Enabled", or "User Defined Symbology Identifier"). For example, custom attributes inside a C# or .NET assembly may be used to identify ADC device tests stored inside a DLL.

Keywords may be used to create a suite of ADC device tests to test specific functionality or structure in groups or as individual test cases. Groups may be saved as sets or work lists, for quick and easier reuse. The sets or work lists may provide structure for simply and intuitively reporting tests results.

Such an approach may facilitate both high level and low level testing, allowing granularity of testing to be simply and easily adjusted as desired.

Networked Environment

Figure 2:
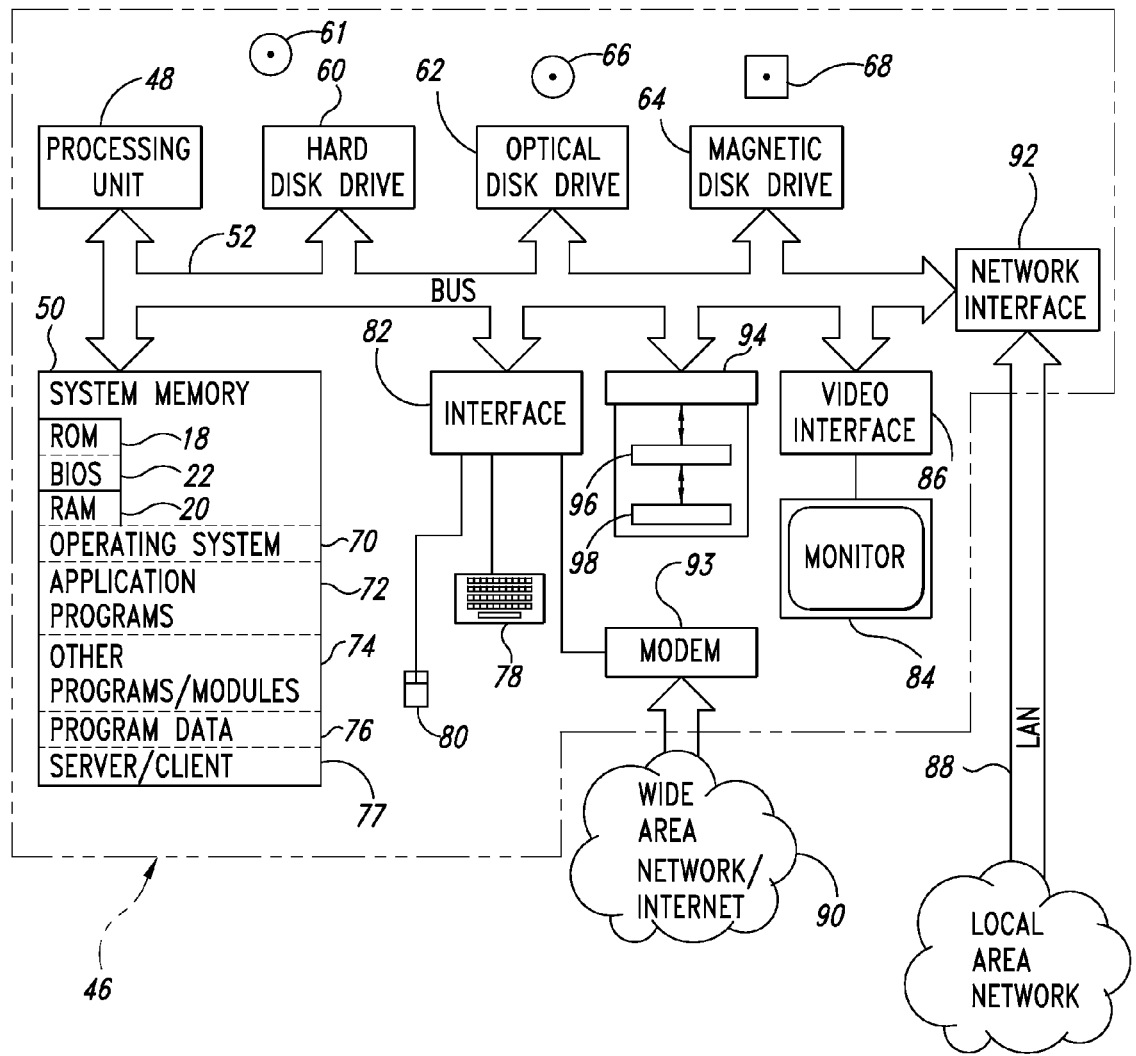
FIG. 2 is a functional block diagram of a computing system suitable for use in the networked environment of FIG. 1, according to one illustrated embodiment.

FIGS. 1 and 2, and the following discussion provide a brief general description of a suitable environment in which embodiments may be implemented. Although not required, embodiments will be described in the general context of computer executable instructions, such as program application modules, objects, or macros being executed by a computer. Those skilled in the relevant art will appreciate that the invention can be practiced with other system configurations including handheld devices, multiprocessor systems, micro-processor based or programmable consumer electronics, network PCs, minicomputers, mainframe computers, and the like. Embodiments can be practiced in distributed environments where tasks or modules are performed by remote processing devices, which are linked through a communications network. In a distributed environment, programming modules may be located in both local and remote memory storage devices.

In particular, FIG. 1 shows a networked environment 10 comprising a testing computing system 12, local and remote tester operated computing systems 14a, 14b, respectively, and automated data collection device platforms 16a-16d, communicatively coupled via a one or more networks 17 such as a local area network (LAN), and/or wide area network (WAN), for example the Internet. The network 17 may take the form of one or more extranets or intranets, or other types of networks, and can employ any of a variety of network architectures. The testing computing system 12, tester operated computing systems 14a, 14b and/or automated data collection device platforms 16a-16d may alternatively or additional employ point-to-point communications.

Testing Computing System

As described in more detail below, the testing computing system 12 may take the form of one or more computers, for example a test computer 18 and may optionally include a monitor 20 and one or more user input devices 22 such as a keyboard, keypad, mouse, trackball, digitizing tablet and/or touch screen display. The testing computing system 12 may also include one or more storage devices 24 for storing information such as one or more databases. While illustrated as being external to the test computer 18, one or more of the data storage devices 24 may be located internally in a housing of the test computer 18.

Tester Operated Computing Systems

The local and remote tester operated computing systems 14a, 14b may take the form of a personal computer (PC), mini- or microcomputer and/or workstation 26 configured to function as a server and/or client, and may optionally include a monitor 28 and one or more user input devices 30 such as a keyboard, keypad, mouse, trackball, digitizing tablet, and/or touch screen display. Some of the tester operated computing systems 14a may be communicatively coupled to the testing computing system 12 via a local area network 32, while others of the designer operated computing systems 14b may be coupled to the testing computing system 12 via the wide area network 17.

ADC Device Platforms

The ADC device platforms 16a-16d may take a variety of forms, each of which comprises one or more ADC devices.

The ADC device platform 16a may, for example, take the form of a point-of-sale (POS) terminal commonly found at retail locations. The POS terminal may include a handheld optical reading device 34a for optically reading symbols such as machine-readable barcode symbols 36a carried by items or tags. The handheld optical reading device 34a may include an image capture device, for example a linear imager or a two-dimensional imager, for capturing an image of the machine-readable symbol 36a. The handheld optical reading device 34a may optionally include an illumination system, for example a flood illumination system, for illuminating the machine-readable symbol 36a. The ADC device platform 16a may also include an employee operated magnetic stripe reader 34b for reading information encoded in a magnetic stripe carried on a card 36b such as a credit card, debit card and/or a gift card.

Another ADC device platform 16b may take the form of a personal computer with a variety of ADC devices coupled via a serial port, the personal computer storing and executing instructions for processing data captured by the ADC devices. In particular, the ADC devices may include a handheld RFID reader 34c operable for wirelessly reading or interrogating RFID tags. The ADC devices may include a handheld wand style machine-readable symbol reader 34d. The wand style machine-readable symbol reader 34d may be moved across a machine-readable symbol in order to capture the information encoded in the machine-readable symbol via scanning. The ADC device platform 16b may further include a magnetic stripe reader 34e.

A further ADC device platform 16c may take the form of a POS terminal, such as those commonly found in retail stores such as grocery or supermarkets. Such an ADC device platform 16c may include a fixed barcode scanner 34f. Items bearing machine-readable symbols may be passed over the fixed barcode scanner 34f to capture the information encoded in the machine-readable symbol by scanning. The ADC device platform 16c may also include a customer operated magnetic stripe reader 34g. The magnetic stripe reader 34g may be similar to those commonly found in retail stores such as grocery or supermarkets, which allow the customer to make payment by credit, debit and/or gift cards. Such magnetic stripe readers typically include a keypad that allows the customer to enter information such as a personal identity number (PIN), and to make a selection, such as whether to receive cash back from the retailer.

Yet another ADC device platform 16d may take the form of a fixed RFID interrogation system including a set of transceivers and antennas 34h distributed about a facility for wirelessly reading RFID tags 36c encoding information to determine the presence or absence, location or position, and/or information encoded in, the RFID tags 36c. The transceivers and antennas 34h may be communicatively coupled via a network to one or more centralized computing systems that operates and/or collects data read from the RFID tags 36c. The facility may take a variety of forms, for example, a manufacturing facility, warehouse, shipping center and/or retail store.

One or more ADC devices 34a-34h may be integrated into the ADC platform 16a-16d, or may be communicatively coupled to the ADC device platform 16a, 16d by wired connections, for example serial cables and/or parallel cables, and/or wireless connections, for example infrared transceivers or Bluetooth transceivers.

Computing Systems

In particular, FIG. 2 shows a conventional personal computer referred to herein as computing system 46 that may be appropriately configured to function as either the test computer 18, as one of the tester operated computing systems 14a-14b, or as the computing system portion of one of the automatic data collection platforms 16a-16d.

The computing system 46 includes a processing unit 48, a system memory 50 and a system bus 52 that couples various system components including the system memory 50 to the processing unit 48. The processing unit 48 may be any logical processing unit, such as one or more central processing units (CPUs), digital signal processors (DSPs), application-specific integrated circuits (ASICs), etc. Unless described otherwise, the construction and operation of the various blocks shown in FIG. 2 are of conventional design. As a result, such blocks need not be described in further detail herein, as they will be understood by those skilled in the relevant art.

The system bus 52 can employ any known bus structures or architectures, including a memory bus with memory controller, a peripheral bus, and/or a local bus. The system memory 50 includes read-only memory ("ROM") 54 and random access memory ("RAM") 56. A basic input/output system ("BIOS") 58, which can form part of the ROM 54, contains basic routines that help transfer information between elements within the computing system 46, such as during startup.

The computing system 46 also includes one or more spinning media memories such as a hard disk drive 60 for reading from and writing to a hard disk 61, and an optical disk drive 62 and a magnetic disk drive 64 for reading from and writing to removable optical disks 66 and magnetic disks 68, respectively. The optical disk 66 can be a CD-ROM, while the magnetic disk 68 can be a magnetic floppy disk or diskette. The hard disk drive 60, optical disk drive 62 and magnetic disk drive 64 communicate with the processing unit 48 via the bus 52. The hard disk drive 60, optical disk drive 62 and magnetic disk drive 64 may include interfaces or controllers coupled between such drives and the bus 52, as is known by those skilled in the relevant art, for example via an IDE (i.e., Integrated Drive Electronics) interface. The drives 60, 62 and 64, and their associated computer-readable media 61, 66 and 68, provide nonvolatile storage of computer-readable instructions, data structures, program modules and other data for the computing system 46. Although the depicted computing system 46 employs hard disk 61, optical disk 66 and magnetic disk 68, those skilled in the relevant art will appreciate that other types of spinning media memory computer-readable media may be employed, such as digital video disks ("DVDs"), Bernoulli cartridges, etc. Those skilled in the relevant art will also appreciate that other types of computer-readable media that can store data accessible by a computer may be employed, for example, non-spinning media memories such as magnetic cassettes, flash memory cards, RAMs, ROMs, smart cards, etc.

Program modules can be stored in the system memory 50, such as an operating system 70, one or more application programs 72, other programs or modules 74, and program data 76. The applications programs 72 may include one or more programs for locating ADC device platforms and/or ADC devices, selecting appropriate tests, analyzing results of the tests, and delivering the analysis in order to validate ADC device builds. The system memory 50 also includes one or more communications programs 77 for permitting the computing system 46 to access and exchange data with sources such as websites of the Internet, corporate intranets, or other networks, as well as other server applications on server computers. The communications program 77 may take the form of one or more server programs. Alternatively, or additionally, the communications program may take the form of one or more browser programs, particularly where the computing system 46. The communications program 77 may be markup language based, such as hypertext markup language ("HTML"), Extensible Markup Language (XML) or Wireless Markup Language (WML), and operate with markup languages that use syntactically delimited characters added to the data of a document to represent the structure of the document. A number of Web clients or browsers are commercially available such as NETSCAPE NAVIGATOR® from America Online, and INTERNET EXPLORER® available from Microsoft Corporation of Redmond Wash.

While shown in FIG. 2 as being stored in the system memory 50, the operating system 70, application programs 72, other program modules 74, program data 76 and communications program 77 can be stored on the hard disk 61 of the hard disk drive 60, the optical disk 66 and the optical disk drive 62 and/or the magnetic disk 68 of the magnetic disk drive 64.

A user can enter commands and information to the computing system 46 through input devices such as a keyboard 78 and a pointing device such as a mouse 80. Other input devices can include a microphone, joystick, game pad, scanner, etc. These and other input devices are connected to the processing unit 48 through an interface 82 such as a serial port interface that couples to the bus 52, although other interfaces such as a parallel port, a game port or a universal serial bus ("USB") can be used. A monitor 84 or other display devices may be coupled to the bus 52 via video interface 86, such as a video adapter. The computing system 46 can include other output devices such as speakers, printers, etc.

The computing system 46 can operate in a networked environment 10 (FIG. 1) using logical connections to one or more remote computers. The computing system 46 may employ any known means of communications, such as through a local area network ("LAN") 88 or a wide area network ("WAN") or the Internet 90. Such networking environments are well known in enterprise-wide computer networks, intranets, extranets, and the Internet.

When used in a LAN networking environment, the computing system 46 is connected to the LAN 88 through an adapter or network interface 92 (communicatively linked to the bus 52). When used in a WAN networking environment, the computing system 46 often includes a modem 93 or other device for establishing communications over the WAN/Internet 90. The modem 93 is shown in FIG. 2 as communicatively linked between the interface 82 and the WAN/Internet 90. In a networked environment, program modules, application programs, or data, or portions thereof, can be stored in a server computer (not shown). Those skilled in the relevant art will readily recognize that the network connections shown in FIG. 2 are only some examples of establishing communications links between computers, and other communications links may be used, including wireless links.

The computing system 46 may include one or more interfaces such as slot 94 to allow the addition of devices 96, 98 either internally or externally to the computing system 46. For example, suitable interfaces may include ISA (i.e., Industry Standard Architecture), IDE, PCI (i.e., Personal Computer Interface) and/or AGP (i.e., Advance Graphics Processor) slot connectors for option cards, serial and/or parallel ports, USB ports (i.e., Universal Serial Bus), audio input/output (i.e., I/O) and MIDI/joystick connectors, and/or slots for memory.

The term "computer-readable medium" as used herein refers to any medium that participates in providing instructions to processing unit 48 for execution. Such a medium may take many forms, including but not limited to, non-volatile media, volatile media, and transmission media. Non-volatile media includes, for example, hard, optical or magnetic disks 61, 66, 68, respectively. Volatile media includes dynamic memory, such as system memory 50. Transmission media includes coaxial cables, copper wire and fiber optics, including the wires that comprise system bus 52. Transmission media can also take the form of acoustic or light waves, such as those generated during radio wave and infrared data communications.

Common forms of computer-readable media include, for example, floppy disk, flexible disk, hard disk, magnetic tape, or any other magnetic medium, CD-ROM, any other optical medium, punch cards, paper tape, any other physical medium with patterns of holes, RAM, PROM, EPROM, EEPROM, FLASH memory, any other memory chip or cartridge, a carrier wave as described herein, or any other medium from which a computer can read.

Various forms of computer readable media may be involved in carrying one or more sequences of one or more instructions to processing unit 48 for execution. For example, the instructions may initially be carried on a magnetic disk of a remote computer. The remote computer can load the instructions into its dynamic memory and send the instructions over a telephone line using a modem. A modem 93 local to computer system 46 can receive the data on the telephone line and use an infrared transmitter to convert the data to an infrared signal. An infrared detector coupled to the system bus 52 can receive the data carried in the infrared signal and place the data on system bus 52. The system bus 52 carries the data to system memory 50, from which processing unit 48 retrieves and executes the instructions. The instructions received by system memory 50 may optionally be stored on a storage device either before or after execution by processing unit 48.

Figure 3:
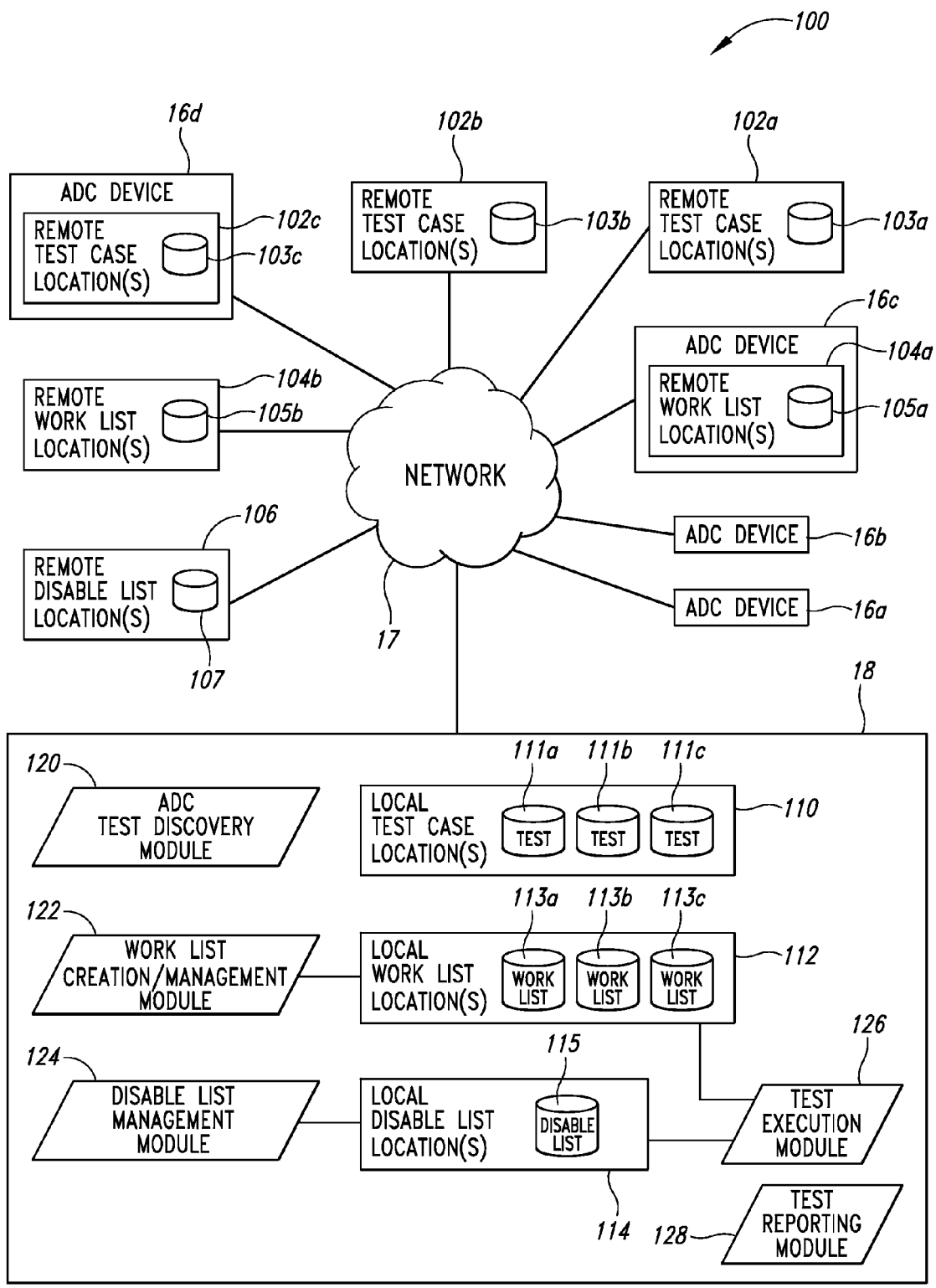
FIG. 3 is a schematic diagram showing stored information and logic, according to one illustrated embodiment.

FIG. 3 shows a networked environment 100 including the test computer 18 interacting with various networked elements via the network 17, according to one illustrated embodiment.

The various networked elements may include one or more ADC devices or platforms, for example ADC devices 16a-16d (collectively 16).

The networked elements may also include a number of remote test case locations 102a-102c (collectively 102). Each of the remote test case locations 102 store one or more test case executable programs, modules or processes 103a-103c (collectively 103), which may be run against one or more of the ADC devices 16. One or more of the remote test case locations 102 may reside on one or more of the ADC devices 16. For example, one of the remote test cases locations 102c may reside on one of the ADC devices 16d. One or more of the remote test case locations 102 may reside on one or more computers, storage devices or other networked elements. For example, remote test case locations 102a, 102b may reside on networked computers and/or storage devices of one or more ADC device manufacturers, distributors and/or end users.

The networked elements may further include one or more remote work list locations 104a-104b (collectively 104). Each of the remote work list locations store one or more work lists 105a, 105b (collectively 105) that identify one or more tests that may be run against one or more ADC devices 16. The work list 105 may define an order of test execution, and/or a number of times each test is to be executed. One or more of the remote work list locations 104 may reside on one or more of the ADC devices 16. For example, a first remote work list location 104a may reside on the ADC device 16c. One or more of the remote work list locations 104 may reside on one or more computers, storage devices or other networked elements. For example, remote work list locations 104b may reside on networked computers and/or storage devices of one or more ADC device manufacturers, distributors and/or end users.

The networked elements may additionally include one or more remote disabled list locations 106 (only one illustrated). Each of the remote disable list locations 106 store one or more disable lists 107. The disable lists identify tests that have been temporarily or permanently disabled. For example, where an known error is undergoing troubleshooting, it may be efficient to avoid running a test that will result in an error until, the troubleshooting and/or repair is completed. The remote disable list locations 106 may reside on one or more of the ADC devices 16, and/or on one or more computers, storage devices or other networked elements, for example, one or more networked computers and/or storage devices of one or more ADC device manufacturers, distributors and/or end users.

The test computer 18 may include one or more local test case locations 110 that stores one or more local test case executables 111*a*-111*c* (collectively 111). The test computer system 18 may also include one or more local work list locations 112 that stores one or more work lists 113*a*-113*c* (collectively 113). The test computer system 18 may further include one or more local disable list locations 114 which may store one or more disable lists 115.

The test computer system 18 may include or may execute a test discovery executable, module or process 120. As discussed in detail below, the ADC device test discovery executable, module or process 120 discovers ADC device tests on the network 17 including ADC device tests in the remote test locations 102 as well as the local test locations 110.

The test computer system 18 may also include a work list creation/management executable, module or process 122. As discussed in detail below, the work list creation/management executable, module or process 122 may facilitate the discovery, creation and/or management of lists or sets of tests or scripts, referred herein as work lists.

The test computer system 18 further includes a disable list management executable, module or process 124. As discussed in more detail below, the disable list management executable, module or process 124 may discover disable lists at one or more remote disable list locations 106 as well as the local disable list locations 114. In some embodiments there may be a single global disable list (e.g., local disable list 115) and single disable list location (e.g., local disable list location 114).

The test computer system 18 may even further include a test execution executable, module or process 126. As discussed in detail below, the test execution module 126 executes the executable ADC device test executable, module or process 103. Hence the test execution module 126 runs the ADC device test executable, module or process 103 against one or more target ADC devices 16.

The test computer system 18 may additionally include a test reporting executable, module or process 128. As discussed in more detail below, the test reporting executable, module or process 128 may facilitate reporting of interim test results as well as reporting of final test results. The test results may advantageously be formatted within the work lists, as described in more detail below.

Figure 4:
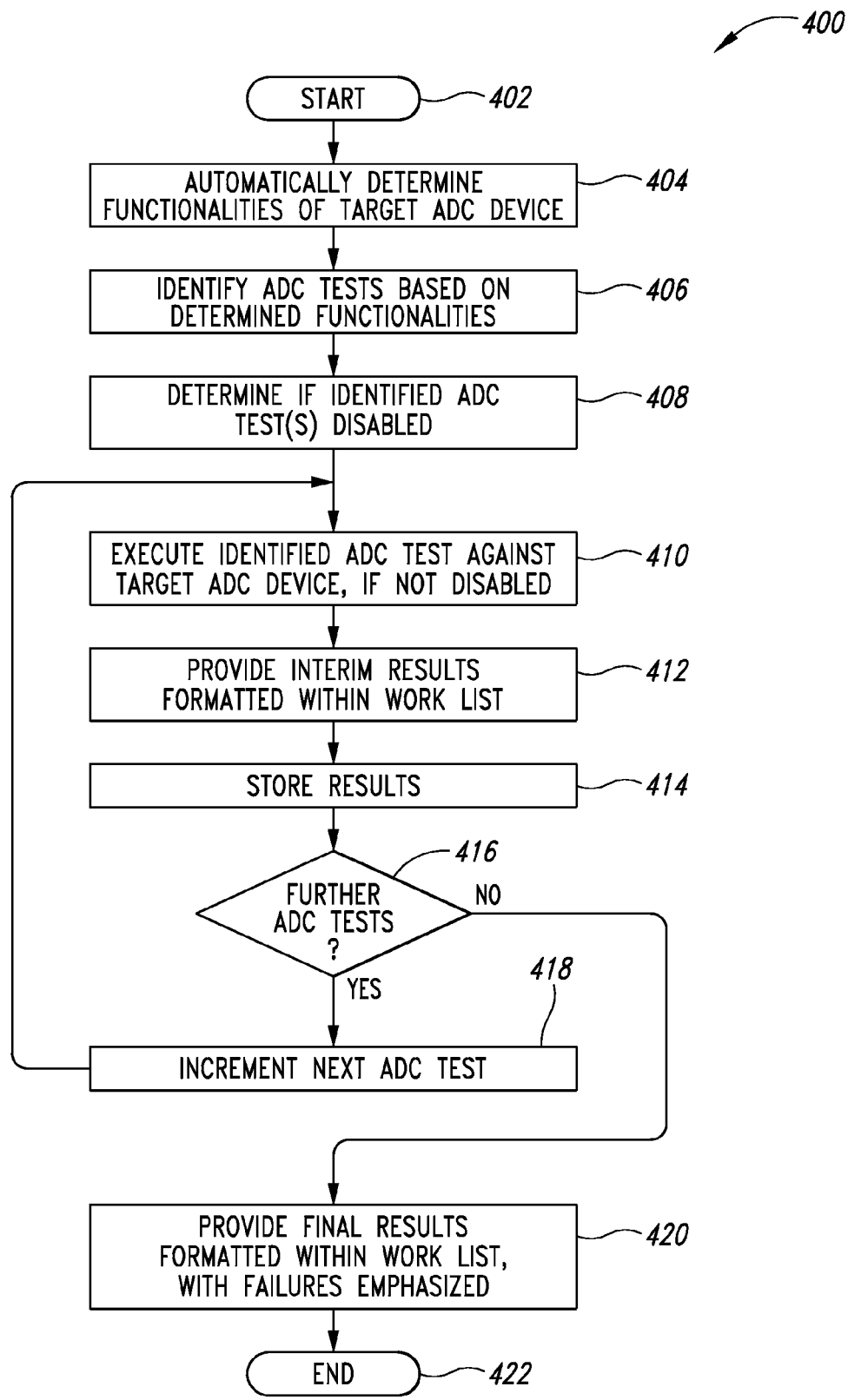
FIG. 4 is a high-level flow diagram showing a method of identifying and running ADC device tests against target ADC devices, according to one illustrated embodiment.

FIG. 4 shows a method 400 of automatically identifying and executing ADC device tests against target ADC devices 16, according to one illustrated embodiment.

The method 400 may start at 402, for example, in response to a user input or in response to a signal from a test scheduler.

At 404, the test computer 18 automatically determines functionalities of target ADC devices 16. For example, the test computer 18 may determine the functionalities based on an identifier or configuration number. The identifier or configuration number may, for example, take the form of a numeric string, alphabetic string, alphanumeric string or binary string. The identifier or configuration number may have multi-positions, where individual or groups of positions represent certain functionalities. For example, the first four positions (e.g., from right to left, or from left to right) may represent the communications functionality of the target ADC device 16, such as whether the target ADC device has a radio, operates in batch mode, and/or has local or wide area network functionality. The following position may represent the type and amount of memory in the target ADC device 16, for example the amount of RAM and/or ROM. The following position may represent whether and/or what type of scan engine or imager the target ADC device 16 employs, for example a linear imager or area imager. Another position may indicate whether the target ADC device 16 is BLUETOOTH® enabled. The identifier or configuration number may of course represent other functionalities. The test computer 18 may employ one or more masks for determining the specific functionalities of the target ADC device 16.

At 406, the test computer 18 identifies tests based on the determined functionalities of the ADC device. At 408, the test computer 18 determines if the identified tests are disabled, for example, by querying one or more disabled lists 107, 115.

At 410, the test computer 18 executes identified ADC executables, modules or processes 103 against the target ADC device 16, if the corresponding ADC device test is not identified as being disabled. At 412, the test computer 18 provides interim results formatted within a work list. Optionally at 414, the test computer 18 may store the interim test results.

At 416, the test computer 18 determines whether there are further ADC device tests. If there are further ADC device tests, the test computer 18 increments to a next ADC device test at 418 and returns control to 410. If there are no further ADC device tests, control passes to 420 where the test computer 18 provides final results. The final results may be formatted within a work list with failures emphasized. The method 400 terminates at 422.

Figure 5:
FIG. 5 is a flow diagram showing a method of automatically determining functionality of a target ADC device, according to one illustrated embodiment.

FIG. 5 shows a method 424 of automatically determining functionalities of target ADC devices 16. The method 424 may implement the act 404 in the method 400 (FIG. 4).

At 426, the test computer 18 remotely queries a target ADC device 16. The test computer 18 may provide queries in a similar fashion to that described in U.S. patent application Ser. No. 11/130,792 filed May 17, 2005, Ser. No. 10/934,064 filed Sep. 3, 2004, and/or Ser. No. 09/240,108 filed Jan. 29, 1999.

Figure 6:
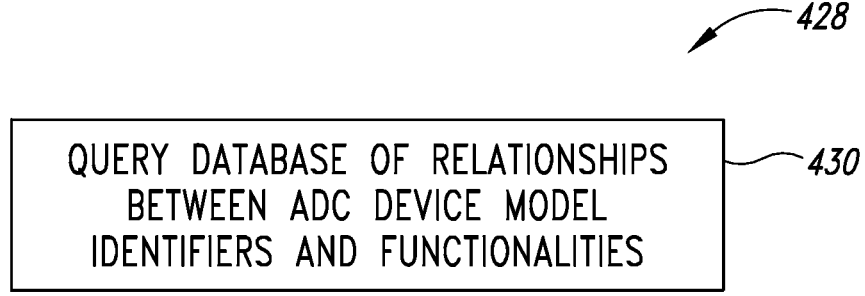
FIG. 6 is a flow diagram showing a method of automatically determining functionality of a target ADC device, according to another illustrated embodiment.

FIG. 6 shows a method 428 of automatically determining functionalities of target ADC devices. The method 428 may implement the act 404 of method 400 (FIG. 4).

At 430, the test computer 18 queries a database of relationships between an ADC device model identifier and functionalities. The database may be stored at the ADC device or ADC device platform, or may be stored elsewhere including at the test computer 18 or associated database 24.

Figure 7:
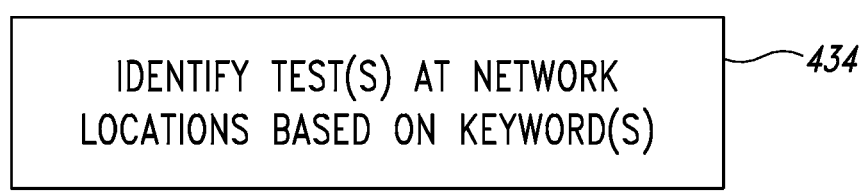
FIG. 7 is a flow diagram showing a method of identifying or locating ADC device tests, according to one illustrated embodiment.

FIG. 7 shows a method 432 of identifying ADC device tests based on determined functionalities. The method 432 may implement the act 406 of method 400 (FIG. 4).

At 434, the test computer 18 identifies one or more ADC device tests 103, 111 at one or more network locations 102, 110 based on one or more keywords. The keywords may describe a functionality or structure that is tested by the ADC device test 103, 111. For example, the keyword may be "Data Collection", indicating an ADC device test for testing generic data collection functions and structures. For example, the keyword maybe "1D Symbology", indicating an ADC device test that tests one-dimensional or barcode symbologies. For example, the keyword may be "93i", indicating an ADC device test that tests a particular machine-readable symbology for testing. As other examples, keywords may include "Network", "DHCP Enabled", "User Defined Symbology Identifier" or "UDSI" to name a few.

Figure 8:
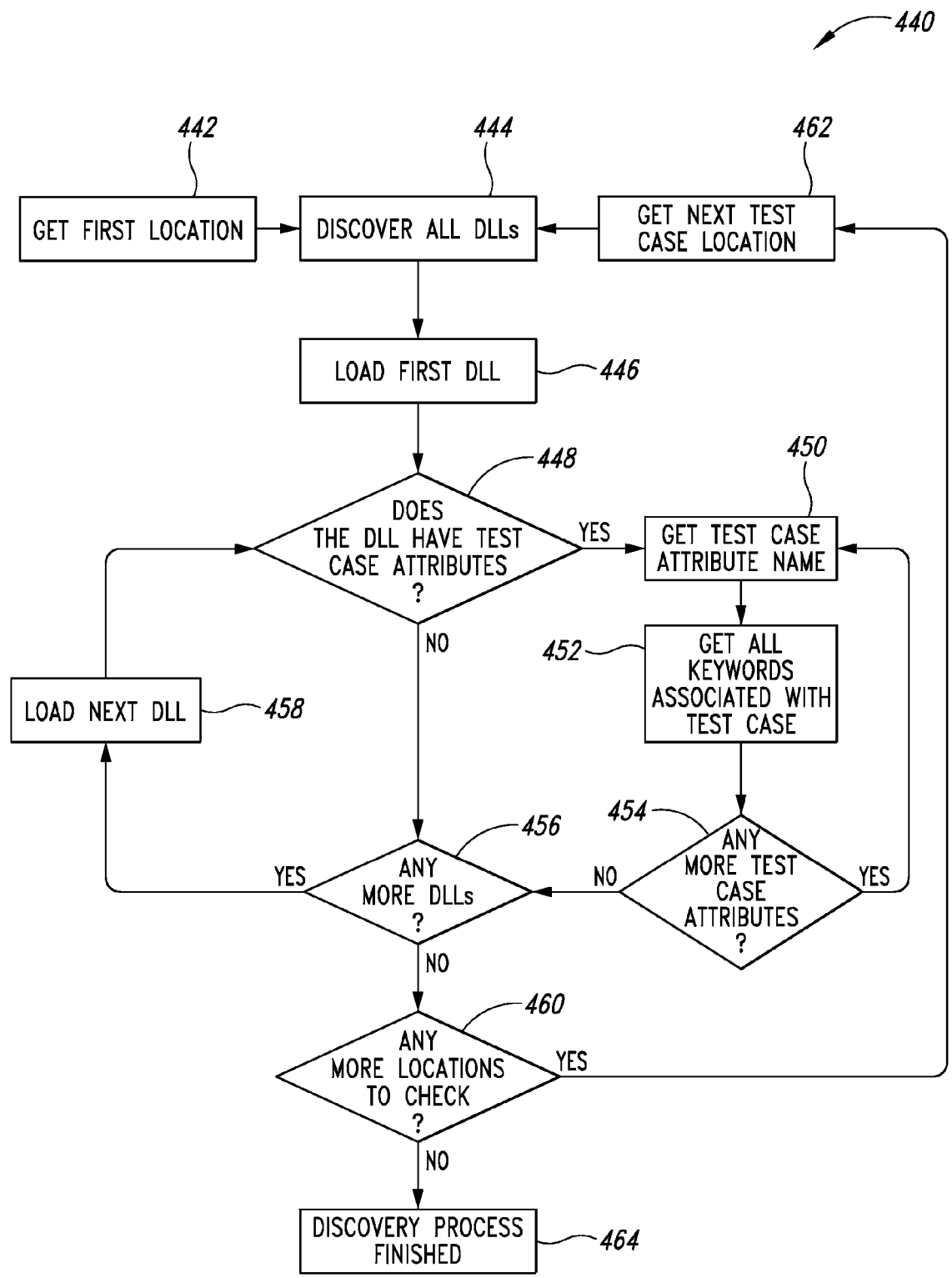
FIG. 8 is a flow diagram showing a method of identifying ADC device tests on a network, according to one illustrated embodiment.

FIG. 8 shows a method 440 of identifying tests at network locations based on keywords. The method 440 may implement the act 434 of method 432 (FIG. 7).

At 442, the test computer 18 identifies or locates a first location on the network 17. At 444, the test computer 18 discovers all dynamically linked libraries (DLLs) at the first location. At 446, the test computer 18 loads the first DLL. At 448, the test computer 18 determines whether the loaded DLL has test case attributes. If the DLL has test case attributes, at 450, the test computer system 18 gets the test case attribute name.

At 452, the test computer 18 gets all keywords associated with the test case. At 454, the test computer 18 determines whether there are any more test case attributes. If there are additional test case attributes, control returns to 450. If there are no more test case attributes, control passes to 456.

At 456, the test computer 18 determines whether there are additional DLLs. If there are additional DLLs, the test computer 18 loads the next DLL at 458, and returns control to 448. If there are no more DLLs, control passes to 460.

At 460, the test computer 18 determines if there are any more network locations to check. If there are further network locations to check, the test computer 18 gets the next test case location and passes control back to 444. If there are no more network locations to check, control passes to 464, with the discovery process completed.

Figure 9:
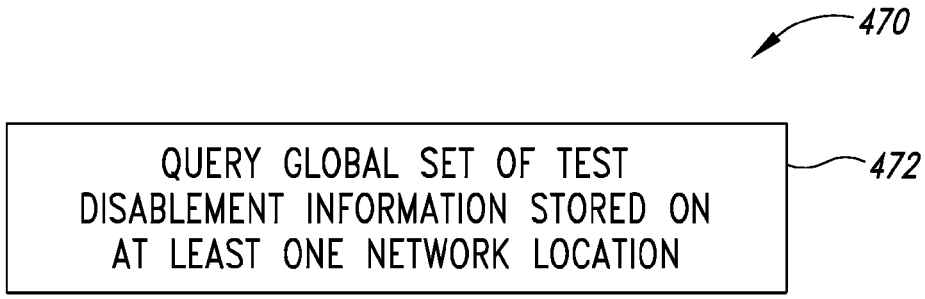
FIG. 9 is a flow diagram showing a method of determining whether an ADC device test is disabled, according to one illustrated embodiment.

FIG. 9 shows a method 470 of determining if an identified test is disabled. The method 470 may implement the act 408 of the method 400 (FIG. 4).

At 472, the test computer 18 queries a global set of test disablement information 107 or 115 stored on at least one network location 106 or 114. The set of test disablement information 107 or 115 may identify specific ADC device tests 103, 111 that are temporarily or permanently disabled. Thus, ADC device tests 103, 111 that test the disabled functionality or structure may be temporarily or permanently disabled. This prevents running an ADC device test 103, 111 where an existing problem is known and it is known that the ADC device test 103, 111 will fail. This approach may be particularly useful where a known problem is being addressed, and would otherwise interfere with testing of other functionality or structure. Having a global set of test disablement information 107 or 115 may make testing more efficient since known problems can be addressed globally.

Figure 10:
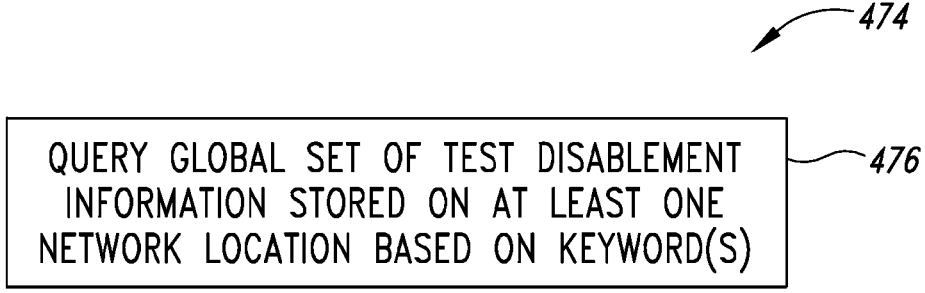
FIG. 10 is a flow diagram showing a method of determining whether an ADC device test is disabled, according to another illustrated embodiment.

FIG. 10 shows a method 474 of determining if identified ADC device tests 103, 111 are disabled. The method 474 may implement the act 408 of method 400 (FIG. 4).

At 476, the test computer 18 queries a global set of test disablement information stored on at least one network location based on keyword. The set of test disablement information 107 or 115 may identify keywords of ADC device tests that are disabled. Thus, ADC device tests 103, 111 that have the same keywords may be temporarily or permanently disabled. As discussed above, this prevents running an ADC device test 103, 111 where an existing problem is known and it is known that the ADC device test 103, 111 will fail.

Figure 11:
FIG. 11 is a flow diagram showing a method of storing a set of tests or work list which may be performed as part of the method illustrated in FIG. 8, according to one illustrated embodiment.

FIG. 11 shows a method 478 of creating sets of ADC devices tests or work lists, according to one illustrated embodiment.

At 480, information identifying one or more ADC device tests 103, 111 to be performed is stored as a work list. The work list may be stored at a remote work list location 104 or at a local work list location 112. The work list may identify one or more ADC device tests 103, 111, an order of the ADC device tests 103 111 within the work list, and/or a number of times each of the ADC device tests 103, 111 is to be performed. The work list may also set parameters or other values for one or more of the ADC device tests 103, 111 or the target ADC device 16.

Storing of the work list(s) may be performed at various points within the method 400 (FIG. 4). Alternatively, or additionally, storing the work list(s) may be performed at one or more points within the method 440 (FIG. 8).

Figure 12:
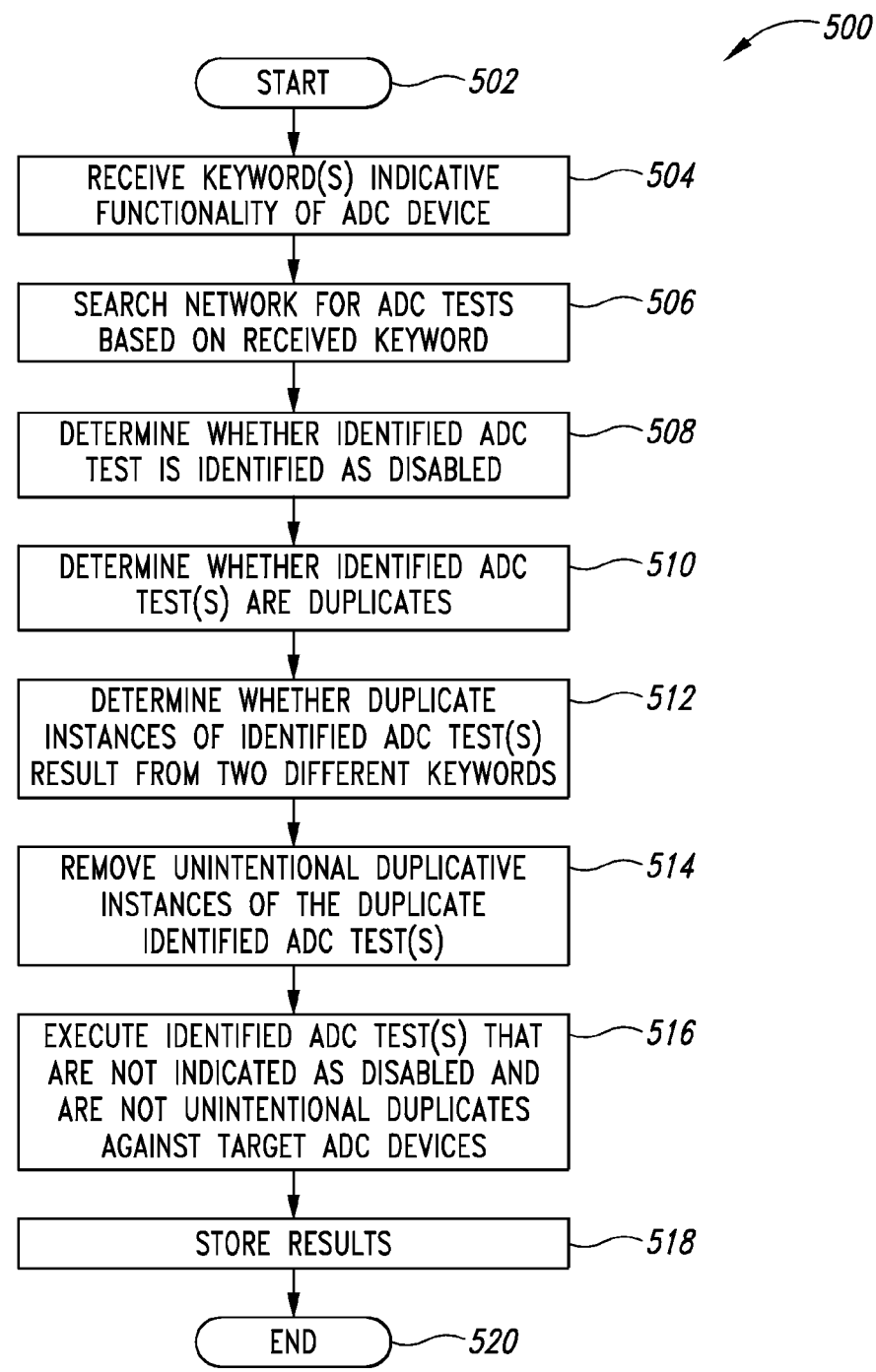
FIG. 12 is a flow diagram showing a method of identifying and executing ADC device tests based on a keyword indicative of functionality, according to one illustrated embodiment.

FIG. 12 shows a method of identifying and executing ADC device tests according to another illustrated embodiment.

The method 500 may start at 502, for example, in response to a user input or signal from a test scheduler.

At 504, the test computer 18 receives one or more keywords indicative of a functionality or structure of an ADC device 16. At 506, the test computer 18 searches the network 17 for ADC device tests 103, 111 based on the received keyword.

At 508, the test computer 18 determines if the identified ADC device tests 103, 111 are identified as disabled on one or more disabled lists 107, 115.

At 510, the test computer 18 determines whether identified ADC device tests 103, 111 are duplicate instances of one another. Duplicate instance may, for example, occur where an ADC device test 103, 111 has two keywords, both of which are part of a work list. In other situations, the same ADC device test 103, 111 may be intentionally invoked a multiple number of times. At 512, the test computer 18 determines whether duplicate instances of identified ADC device tests result from two different keywords. At 514, the test computer 18 removes unintentional duplicate instances of the duplicated identified ADC device tests, if any.

At 516, the test computer 18 executes the identified ADC device tests 103, 111 that are not indicated as being disabled and are not unintentional duplicates against the target ADC device. At 518, the test computer 18 stores results from the execution of the tests. The method 500 terminates at 520.

Figures 13, 14, 15:
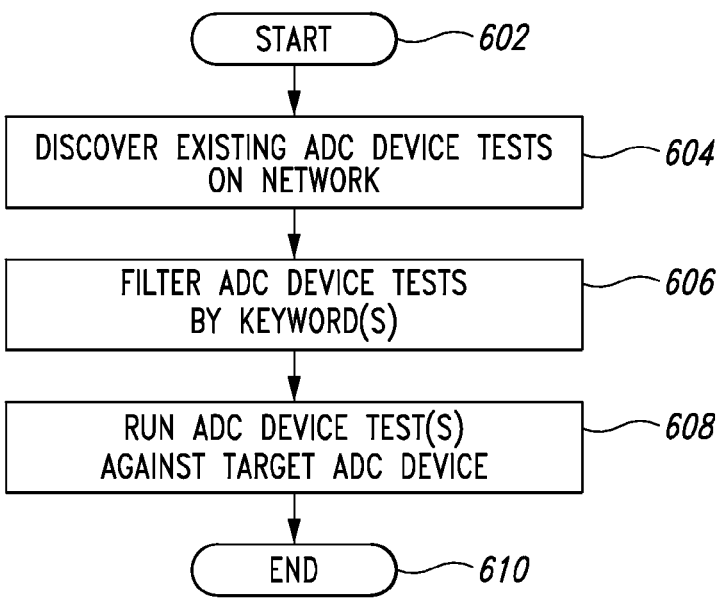
FIG. 13 is a flow diagram showing a method of searching a network for ADC device tests based on keywords, according to one illustrated embodiment.
FIG. 14 is a flow diagram showing a method of identifying or locating ADC device tests by keyword, according to another illustrated embodiment.
FIG. 15 is a flow diagram showing a method of adding keywords to existing ADC device tests, according to one illustrated embodiment.

FIG. 13 shows a method 530 of searching the network for ADC device tests based on received keywords, according to one illustrated embodiment. The method 530 may implement the act 506 of method 500 (FIG. 12).

In particular, the test computer 18 searches directories of computing systems on the network 17 at 532. The test computer 18 may search the directories for DLLs having attributes with keywords that match the keywords in a work list or other query for an ADC device test 103, 111.

FIG. 14 shows a method 600 of discovering and executing ADC device tests according to one illustrated embodiment.

The method 600 may start at 602, for example, in response to a user input or signal from a test scheduler. At 604, the test computer 18 discovers existing ADC device tests 103, 111 on the network 17. At 606, the test computer 18 filters ADC device tests 103, 111 by keyword(s). At 608, the test computer 18 runs the ADC device tests 103 111 that remain against a target ADC device 16. The method 600 terminates at 610.

When crating an ADC device test 103, 111, the developer adds the name and keywords as attributes. For example

---

[EastTestCase ( "First Sample Function", "keyword1", "keyword2")]
public bool TestCaseFunction1 (EastTestCaseHelper etcHelper)
{
// . . .
}

--- where the first string in the EastTestCase attribute is the name of the test, and every string after the name is a keyword. All functionality for communicating, logging results, etc. are contained in the EastTestCaseHelper object, which is passed into the executable, module or process.

FIG. 15 shows a method 620 of updating an ADC device test attribute, according to one illustrated embodiment.

At 622, the test computer 18, or another computing system, adds a new keyword to an existing ADC device test 103, 111. For example, the new keyword may be added to an attribute list of a DLL or other executable, module or process that implements the ADC device test 103, 111. The new keyword may be indicative of a new functionality and/or new structure.

Figure 16:
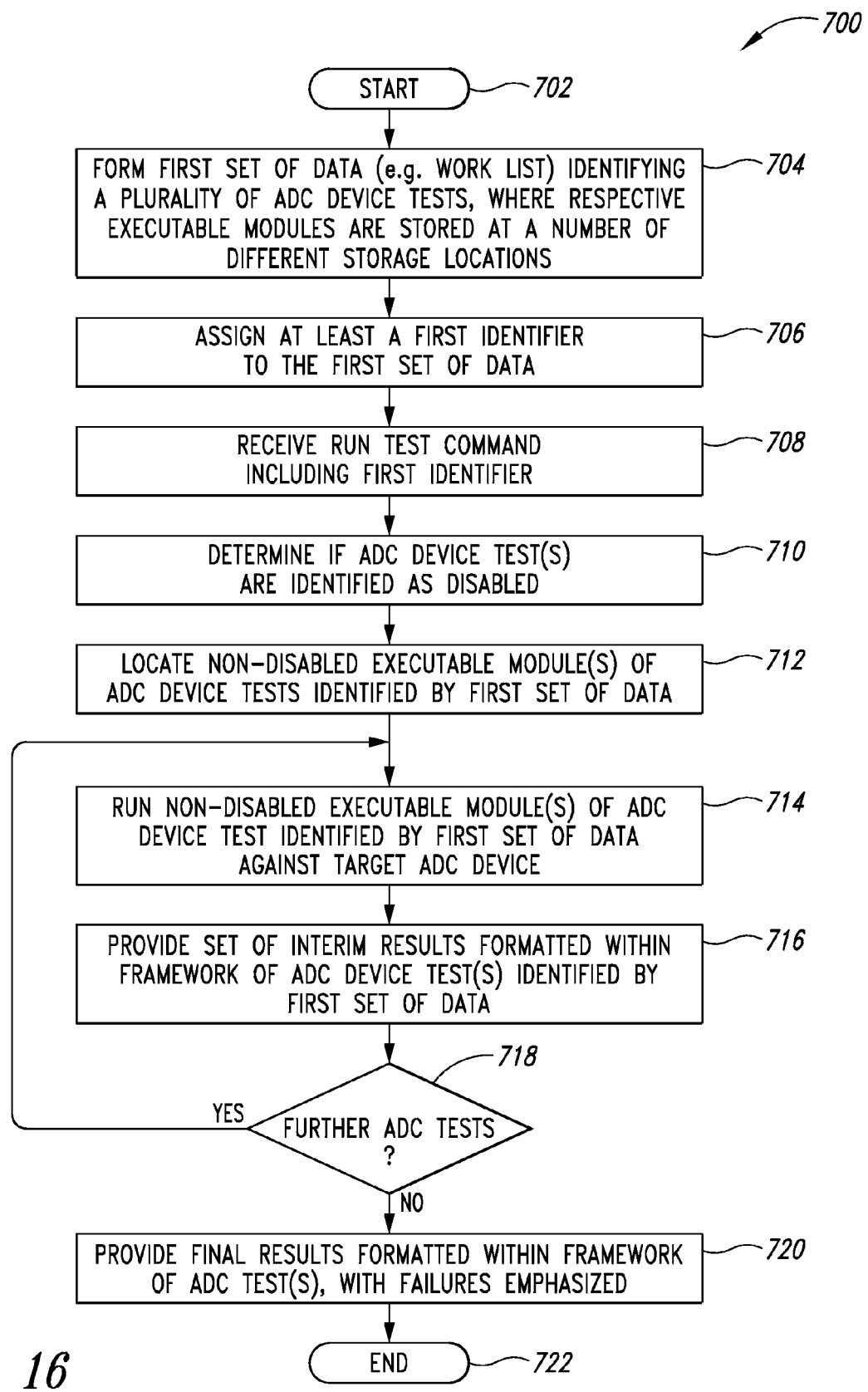
FIG. 16 is a flow diagram showing a method of defining a list of tests of work list, according to one illustrated embodiment.

FIG. 16 shows a method 700 of defining a set of tests or work lists to be executed, and of executing the same, according to one illustrated embodiment.

The method may start at 702, for example, in response to a user input. At 704, the test computer 18 forms a first set of data or work list identifying one or more ADC device tests 103, 111. Respective executables, modules or process such as DLLs may be stored at a number of different storage locations 102, 110 either remotely from the test computer system 18 or the location of the work list, or locally at the test computer system 18 or the location of the work list.

At 706, a test computer 18 assigns at least a first identifier to the first set of data. At 708, the test computer 18 receives a run test command including a first identifier. At 710, the test computer 18 determines if the ADC device tests 103, 111 are disabled. The test computer 18 may, for example, consult one or more locally or remotely stored disabled lists 115, 107, respectively.

At 712, the test computer 18 may locate the non-disabled executables, modules or processes of the ADC device tests 103, 111 identified by the first set of data. At 714, the test computer 18 runs the non-disabled executables, modules or processes of the ADC device tests 103, 111 identified by the first set of data, against one or more target ADC devices 16.

At 716, the test computer 18 provides a set of interim results. The interim results may be formatted within the framework of the ADC device tests 103, 111 or work lists. At 718, the test computer 18 determines whether there are further ADC device tests 103, 111 to be run. If there are further ADC device tests 103, 111 to be run, control returns to 714. If there are no further ADC device tests 103, 111 to be run, control passes to 720.

At 720, the test computer 18 provides final results. The final results may be formatted within the framework of the ADC device tests 103, 111 or work lists. The failures may be emphasized. For example, failures may be displayed with highlighting, marqueeing, flashing, bold, and/or other outstanding visual effects. The method 700 terminates at 722.

Figure 17:
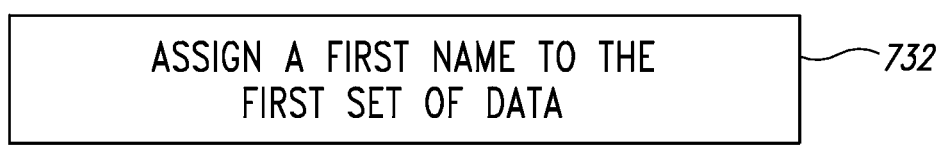
FIG. 17 is a flow diagram showing a method of assigning a name to a list of tests or work lists, according to one illustrated embodiment.

FIG. 17 shows method 730 of assigning at least a first identifier to a set of data, according to one illustrated embodiment. The method 730 may implement the act 706 of the method 700 (FIG. 16).

In particular, a first name is assigned to the first set of data or work list at 732. The name may be indicative of a person or an entity. For example, the name may identify a person who created the work list, or a customer and/or department. The name may indicate a group. For example, the name may indicate a particular group of related ADC devices 16. The name may indicate a particular group of ADC device tests 103, 111. Such a grouping may be of ADC device tests 103, 111 that test a variety of generally unrelated functions or structures, but which are specific to a subset of ADC devices 16. Using names may simplify the tasks of creating, locating, and/or maintaining sets of ADC device tests 103, 111.

Figure 18:
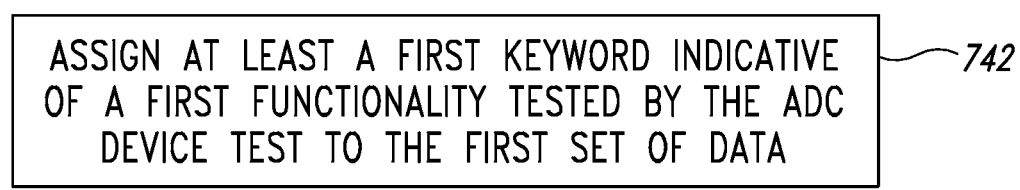
FIG. 18 is a flow diagram showing a method of assigning at least one keyword to a list of tests or work list, according to one illustrated embodiment.

FIG. 18 shows a method 740 of assigning at least a first identifier to the first set of data, according to another illustrated embodiment. The method 740 may implement the act 706 of the method 700 (FIG. 16).

In particular, at least a first keyword indicative of a functionality or structure tested by the ADC device test 103, 111 is assigned to the first set of data at 742. The keyword may take any of a variety of forms, for example, such as the keywords described above. Using keywords may simplify the tasks of creating, locating, and/or maintaining sets of ADC device tests 103, 111.

FIG. 19 shows a work list 800, according to one illustrated embodiment.

The work list 800 contains all of the ADC device tests 103, 111 (FIG. 3) that will be run against the target ADC device 16, and an indication of how may times each individual ADC device test 103, 111 will be run or looped. The work list 800 may also provide an indication of which ADC device test 103, 111 are enabled or disable. An item of the work list 800 may identify an individual ADC device test 103, 111, a keyword, a query or a grouping. If a keyword, query or grouping is looped or repeated, then all of the ADC device tests 103, 111 identified by that keyword, query or grouping are repeated. If a keyword, query or grouping is identified as disabled, then all of the ADC device tests 103, 111 identified by that keyword, query or grouping are disabled.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other ADC device tests systems, not necessarily the exemplary networked ADC device test systems generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms of taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to U.S. patent application Ser. No. 11/130,792 filed May 17, 2005, Ser. No. 10/934,064 filed Sep. 3, 2004, and/or Ser. No.

09/240,108 filed Jan. 29, 1999 are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A method of testing automatic data collection devices, the method comprising:
   automatically locating tested automatic data collection devices on a network;
   communicating with the located tested automatic data collection devices via browser programs;
   automatically determining a set of functionalities of a target automatic data collection device to be tested, wherein the determined set of functionalities includes at least one of: a symbology that the target automatic data collection device is configured to read, a scan engine installed in the target automatic data collection device, an imager installed in the target automatic data collection device, or a radio installed in the target automatic data collection device;
   based on the determined set of functionalities of the target automatic data collection device, automatically identifying a number of automatic data collection tests to be run against the target automatic data collection device;
   executing at least one of the identified automatic data collection tests against the target automatic data collection device; and
   at least temporarily storing a set of results from the execution of the identified automatic data collection tests against the target automatic data collection device.

2. The method of claim 1, further comprising:
   locating respective ones of the identified automatic data collection tests at various locations on a network.

3. The method of claim 1 wherein automatically determining a set of functionalities of a target automatic data collection device to be tested includes remotely querying the target automatic data collection device.

4. The method of claim 1 wherein automatically determining a set of functionalities of a target automatic data collection device to be tested includes querying a database that stores relationships between a number of automatic data collection device model identifiers and a number of functionalities of automatic data collection devices of specific models.

5. The method of claim 1 wherein automatically identifying a number of automatic data collection tests to be run against the target automatic data collection device based on the determined set of functionalities of the target automatic data collection device includes locating respective ones of the identified automatic data collection tests at various locations on a network.

6. The method of claim 5 wherein locating respective ones of the identified automatic data collection tests at various locations on a network includes determining at least one keyword associated with at least one of the functionalities and searching the network based on the determined at least one keyword for automatic data collection tests corresponding to the at least one keyword.

7. The method of claim 6 wherein searching the network based on the determined at least one keyword for automatic data collection tests corresponding to the determined at least one keyword includes searching the network for dynamically linked libraries having attributes with at least one keyword that matches the determined at least one keyword.

8. The method of claim 1, further comprising:
   storing a work list indicative of the identified automatic data collection tests and a respective location of each of the automatic data collection tests on a network, the work list selectively retrievable to rerun the identified automatic data collection tests.

9. A non-transitory computer-readable medium storing instructions that cause a computer to test automatic data collection devices, by:
   automatically locating tested automatic data collection devices on a network;
   communicating with the located tested automatic data collection devices via browser programs;
   automatically determining a set of functionalities of a target automatic data collection device to be tested, wherein the determined set of functionalities includes at least one of: a symbology that the target automatic data collection device is configured to read, a scan engine installed in the target automatic data collection device, an imager installed in the target automatic data collection device, or a radio installed in the target automatic data collection device;
   based on the determined set of functionalities of the target automatic data collection device, automatically identifying a number of automatic data collection tests to be run against the target automatic data collection device;
   executing at least one of the identified automatic data collection tests against the target automatic data collection device; and
   at least temporarily storing a set of results from the execution of the identified automatic data collection tests against the target automatic data collection device.

10. The non-transitory computer-readable medium of claim 9 storing instructions that cause the computer to test automatic data collection devices, further by:
    locating respective ones of the identified automatic data collection tests at various locations on a network.

11. The non-transitory computer-readable medium of claim 10 wherein locating respective ones of the identified automatic data collection tests at various locations on a network includes determining at least one keyword associated with at least one of the functionalities and searching the network based on the determined at least one keyword for automatic data collection tests corresponding to the determined at least one keyword.

12. A method of facilitating testing automatic data collection devices, the method comprising:
    receiving via browser programs at least one keyword that is indicative of at least one functionality or structure provided by some automatic data collection devices, wherein the receiving at least one keyword that is indicative of at least one functionality or structure provided by some automatic data collection devices includes receiving a keyword that is indicative of at least one of a symbology that an automatic data collection device is configured to read, a scan engine installed in the automatic data collection device, an imager installed in the automatic data collection device, or a radio installed in the automatic data collection device; and
    based on the received at least one keyword, searching at least a portion of a network for a number of automatic data collection tests that may be run against the automatic data collection devices which provide the at least one functionality or structure indicated by the keyword.

13. The method of claim 12 wherein searching at least a portion of a network for a number of automatic data collection tests that may be run against the automatic data collection devices which provide the at least one functionality indicated by the keyword includes searching a directory of at least one computing system for dynamically linked libraries having attributes with at least one keyword that match the determined keyword.

14. The method of claim 12 wherein searching at least a portion of a network for a number of automatic data collection tests that may be run against the automatic data collection devices which provide the at least one functionality indicated by the keyword includes searching the entire network for dynamically linked libraries having attributes with at least one keyword that match the determined keyword.

15. The method of claim 12 wherein the receiving at least one keyword that is indicative of at least one functionality provided by some automatic data collection devices includes receiving a keyword that is indicative of a scan engine installed in the automatic data collection device.

16. The method of claim 12, further comprising:
determining whether any of the identified automatic data collection tests are indicated as being disabled.

17. The method of claim 16, further comprising:
executing any of the identified automatic data collection tests that are not indicated as being disabled against a target one of the automatic data collection devices; and
at least temporarily storing a set of results from the execution of the identified automatic data collection tests against the target one of the automatic data collection devices.

18. The method of claim 12, further comprising:
determining whether any of the identified automatic data collection tests are duplicates;
determining whether the duplicate instances of the identified automatic data collection tests were the result of two different keywords;
removing at least one of the instances of the duplicate identified automatic data collection tests; and
executing any of the remaining identified automatic data collection tests as many times as indicated in a work list.

19. A system to facilitate testing automatic data collection devices, the system comprising:
a network connection;
a processor; and
a memory that stores processor executable instructions of browser programs that cause the processor to receive at least one keyword that is indicative of at least one functionality or structure provided by at least one automatic data collection devices, wherein the at least one functionality or structure includes at least one of: a symbology that an automatic data collection device is configured to read, a scan engine installed in the automatic data collection device, an imager installed in the automatic data collection device, or a radio installed in the automatic data collection device, and based on the received at least one keyword, search at least a portion of a network for a number of automatic data collection tests that may be run against the automatic data collection devices which provide the at least one functionality or structure indicated by the keyword.

20. The system of claim 19 wherein searching at least a portion of a network for a number of automatic data collection tests that may be run against the automatic data collection devices which provide the at least one functionality indicated by the keyword includes searching a directory of at least one computing system for dynamically linked libraries having attributes with at least one keyword that match the determined keyword.

21. The system of claim 19 wherein the instructions further cause the processor to determine whether any of the identified automatic data collection tests are indicated as being disabled, execute any of the identified automatic data collection tests that are not indicated as being disabled against a target one of the automatic data collection devices, and at least temporarily store a set of results from the execution of the identified automatic data collection tests against the target one of the automatic data collection devices.

22. A method of automating the remote testing of automatic data collection devices, the method comprising:
automatically locating a plurality of existing automatic data collection device tests on a network;
automatically filtering the automatic data collection device tests by keywords to determine a set of relevant automatic data collection device tests, wherein at least one of the keywords is indicative of at least one of a symbology that an automatic data collection device is configured to read, a scan engine installed in the automatic data collection device, an imager installed in the automatic data collection device, or a radio installed in the automatic data collection device;
running the automatic data collection device tests in the set of relevant automatic data collection device tests against at least one target automatic data collection device; and
communicating to a computing system, via browser programs, a result of the automatic data collection device tests run against the at least one target automatic data collection device.

23. The method of claim 22, further comprising:
determining the keywords based on a functionality available on the at least one target automatic data collection device.

24. The method of claim 22, further comprising:
remotely querying the at least one target automatic data collection device to determine the available functionality.

25. The method of claim 22 wherein locating a plurality of automatic data collection device tests on a network includes querying a plurality of networked devices to identify executable modules.

26. The method of claim 22 wherein locating a plurality of automatic data collection device tests on a network includes querying a plurality of networked devices to identify executable dynamically linked libraries.

27. The method of claim 22, further comprising:
adding a new keyword to a preexisting one of the automatic data collection device tests.

28. A system to automate the remote testing of automatic data collection devices, the system comprising:
a network port to provide a connection to a network; and
a processor configured to locate a plurality of existing automatic data collection device tests on the network, automatically filter the automatic data collection device tests by keywords to determine a set of relevant automatic data collection device tests, wherein at least one of the keywords is indicative of at least one of a symbology that an automatic data collection device is configured to read, a scan engine installed in the automatic data collection device, an imager installed in the automatic data collection device, or a radio installed in the automatic data collection device;

wherein the processor is configured to run the automatic data collection device tests in the set of relevant automatic data collection device tests against at least one target automatic data collection device and communicate to a computing system, via browser programs, a result of the automatic data collection device tests run against the at least one target automatic data collection device.

29. The system of claim 28 wherein the processor is configured to determine the keywords based on a functionality available on the at least one target automatic data collection device.

30. The system of claim 28 wherein the processor is further configured to remotely query the at least one target automatic data collection device to determine the available functionality.

31. The system of claim 28 wherein the processor is further configured to add a new keyword to a preexisting one of the automatic data collection device tests.

* * * * *